(12) United States Patent
Viganò

(10) Patent No.: US 12,448,557 B2
(45) Date of Patent: Oct. 21, 2025

(54) EMULSION STABILIZING AGENTS

(71) Applicant: Lamberti SPA, Albizzate (IT)

(72) Inventor: Laura Viganò, Parabiago (IT)

(73) Assignee: Lamberti SPA, Albizzate (IT)

( * ) Notice: Subject to any disclaimer, the term of this patent is extended or adjusted under 35 U.S.C. 154(b) by 0 days.

(21) Appl. No.: 18/564,984

(22) PCT Filed: Jun. 27, 2022

(86) PCT No.: PCT/EP2022/067605
§ 371 (c)(1),
(2) Date: Nov. 28, 2023

(87) PCT Pub. No.: WO2023/274976
PCT Pub. Date: Jan. 5, 2023

(65) Prior Publication Data
US 2024/0287374 A1     Aug. 29, 2024

(30) Foreign Application Priority Data

Jun. 28, 2021   (IT) .................. 102021000016916

(51) Int. Cl.
*C09K 8/36*     (2006.01)
*C08G 69/28*    (2006.01)

(52) U.S. Cl.
CPC .............. *C09K 8/36* (2013.01); *C08G 69/28* (2013.01); *C09K 2208/12* (2013.01)

(58) Field of Classification Search
None
See application file for complete search history.

(56) References Cited

U.S. PATENT DOCUMENTS

| | | |
|---|---|---|
| 4,501,672 A | 2/1985 | Connell et al. |
| 5,149,690 A | 9/1992 | Patel |
| 2003/0162668 A1 | 8/2003 | Kirsner et al. |
| 2007/0093393 A1* | 4/2007 | Navarrete ............... C09K 23/16 507/131 |
| 2011/0306523 A1 | 12/2011 | Yu et al. |
| 2014/0121135 A1 | 5/2014 | Gamage et al. |
| 2018/0282607 A1 | 10/2018 | Villareal |

FOREIGN PATENT DOCUMENTS

| | | |
|---|---|---|
| CN | 107841298 A | 3/2018 |
| WO | 1989/011516 A1 | 11/1989 |
| WO | 2020104475 A1 | 5/2020 |
| WO | 2023274976 A1 | 1/2023 |

OTHER PUBLICATIONS

ISR-WO dated for parent application PCT/EP2022/067605.

* cited by examiner

*Primary Examiner* — Andrew Sue-Ako
(74) *Attorney, Agent, or Firm* — Vorys, Sater, Seymour and Pease, LLP

(57) ABSTRACT

The present invention relates to emulsion stabilizing agents, to subterranean treatments fluids comprising said emulsion stabilizing agents and to a method of treating subterranean formations using said subterranean treatments fluids.
These emulsion stabilizing agents, besides having excellent emulsifying properties, do not cause the swelling and dispersion of clays and are able to provide subterranean treatments fluids with excellent rheological behaviour even at high temperatures.

16 Claims, 3 Drawing Sheets

1H-NMR - Example 2.

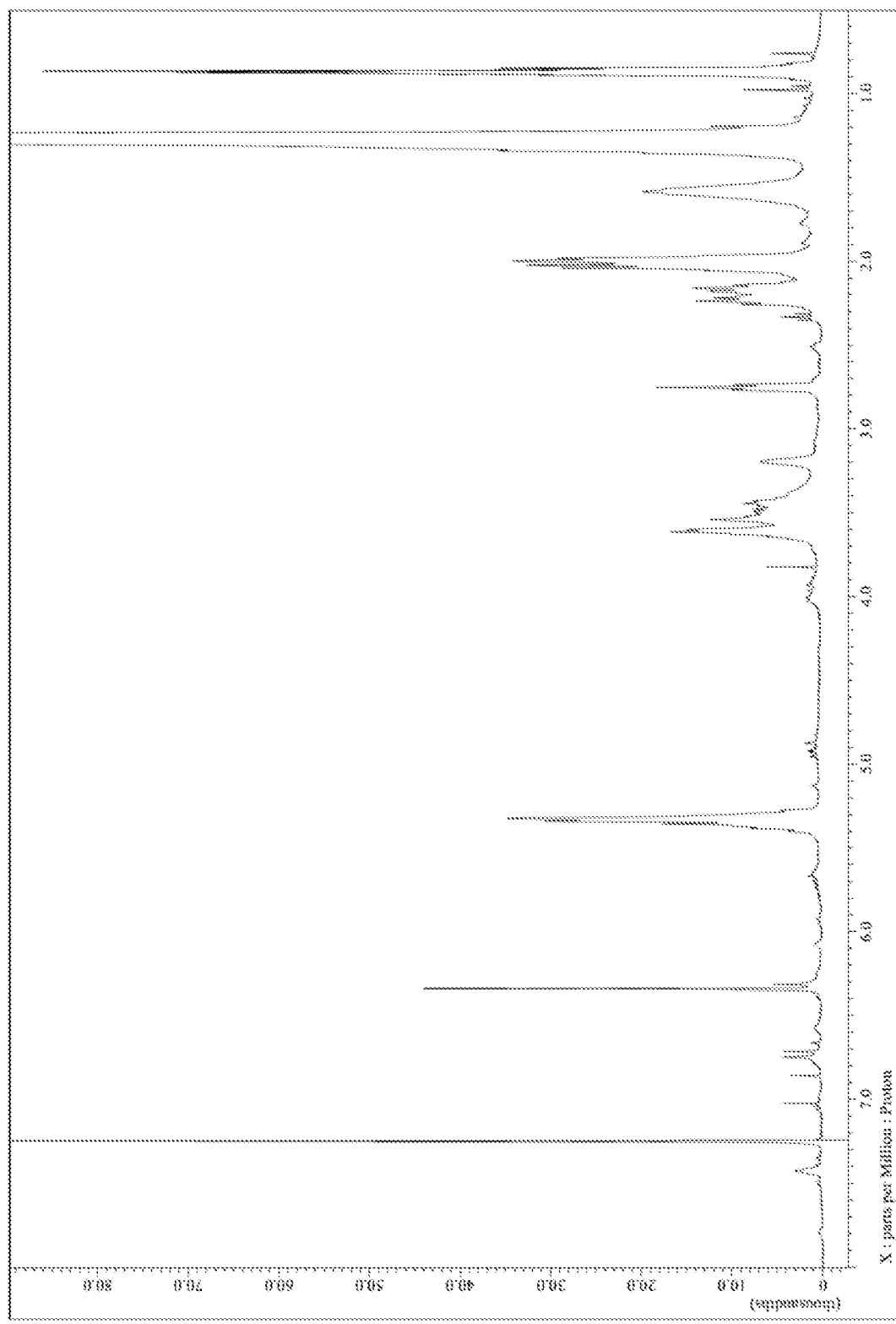
Fig. 1: 1H-NMR - Comparative Example 1.

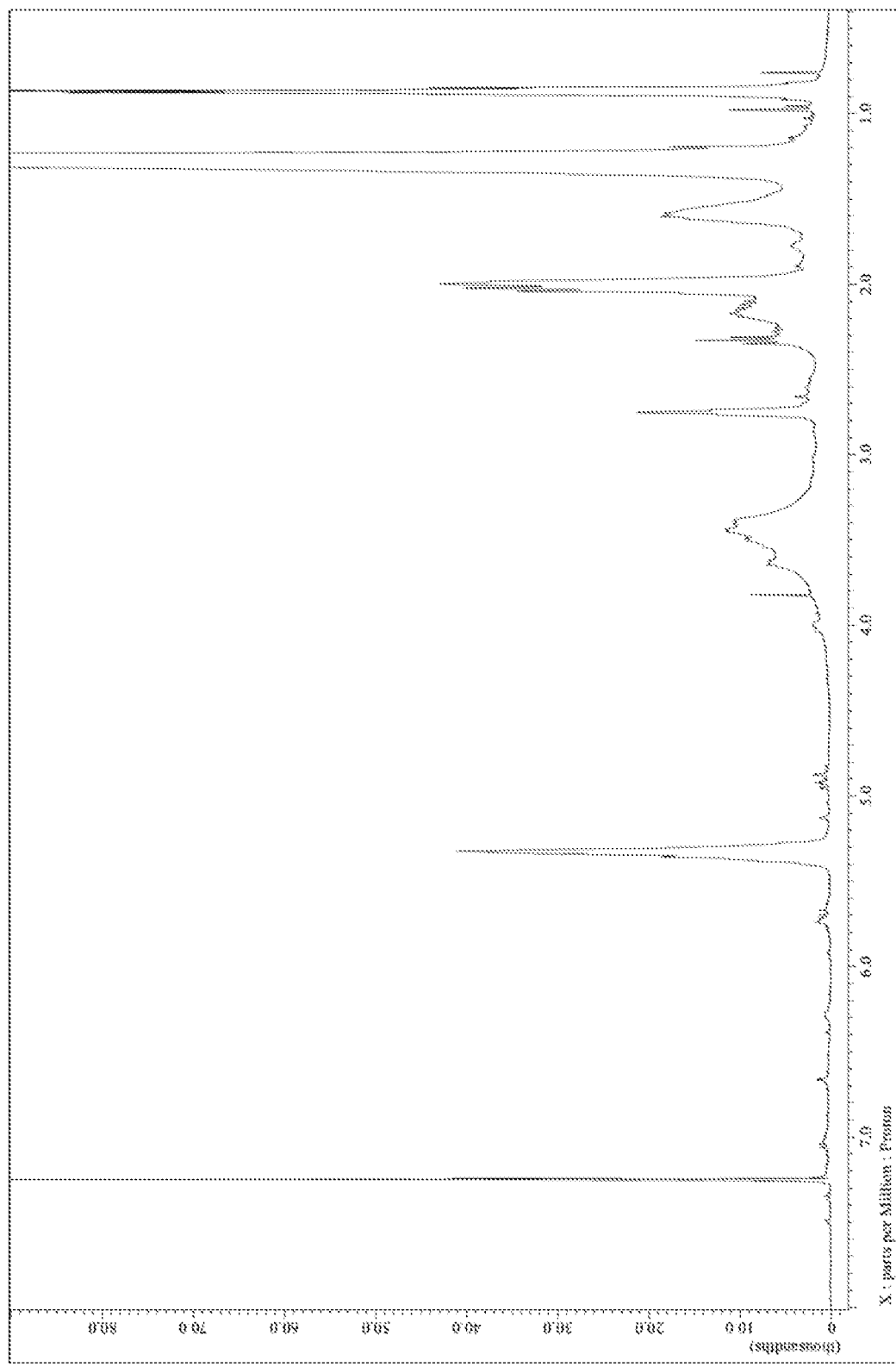
Fig. 2: 1H-NMR - Example 2.

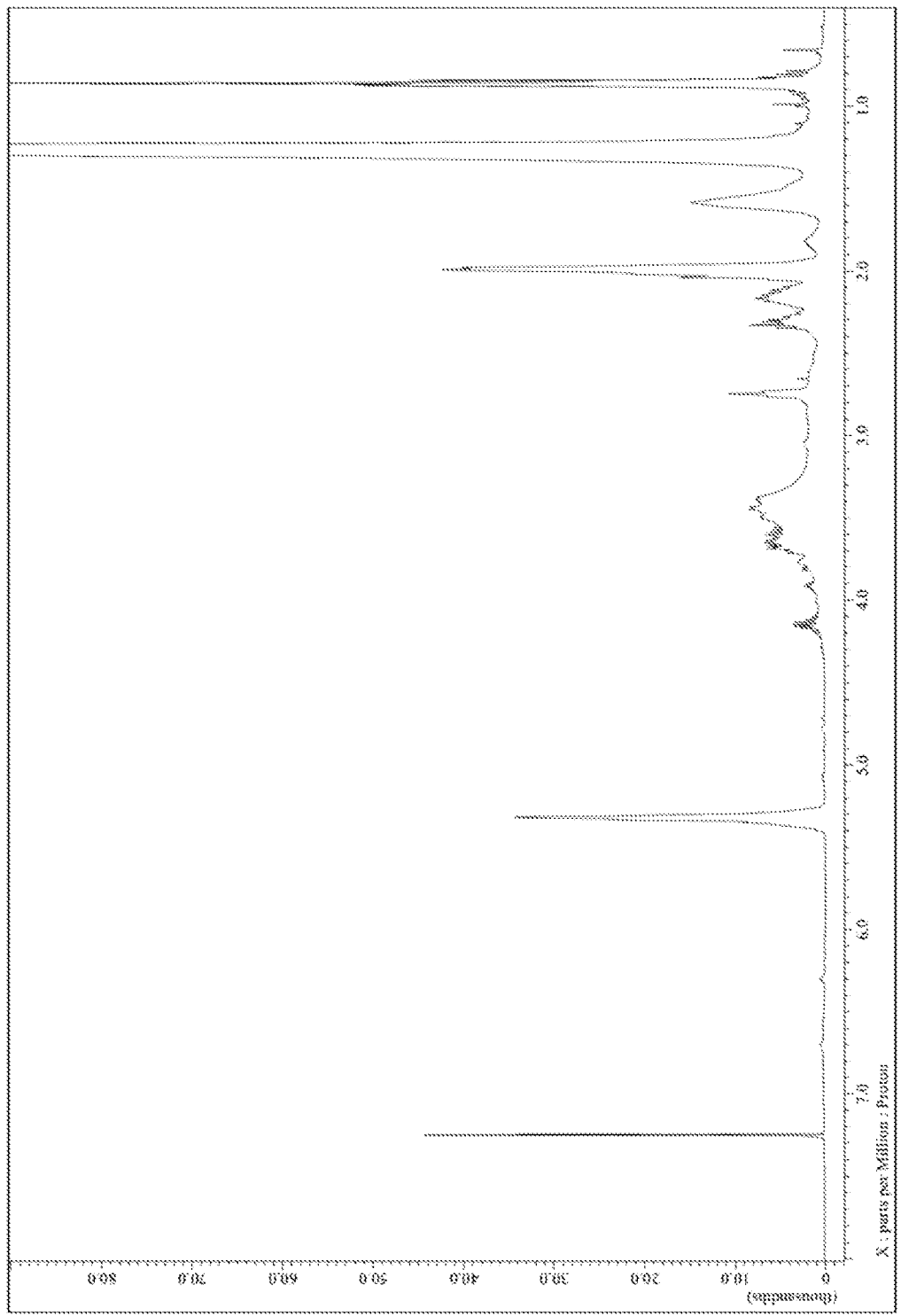
Fig. 3: 1H-NMR - Example 4.

EMULSION STABILIZING AGENTS

FIELD OF THE INVENTION

The present invention relates to emulsion stabilizing agents, to subterranean treatments fluids comprising said emulsion stabilizing agents and to a method of treating subterranean formations using said fluids.

These emulsion stabilizing agents, besides having excellent emulsifying properties, do not cause the swelling and dispersion of clays and are able to provide subterranean treatments fluids with excellent rheological behaviour even at high temperatures.

STATE OF THE ART

Various types of subterranean treatment fluids are used in operations related to the development, completion, and production of natural hydrocarbon reservoirs.

These fluids may be classified according to their fluid base. Water base fluids (WBM) contain solid particles suspended in water or brines. Alternatively, oil-based fluids (OBM) contain solid particles suspended in an oil continuous phase or, possibly, in water or brine emulsified within an oil (water-in-oil emulsions).

Water-in-oil emulsions have the oil phase as the continuous phase and a fluid at least partially immiscible in the oil phase (usually an aqueous-based fluid) as the discontinuous phase. Water-in-oil emulsions may be also referred to as invert emulsions.

Water-based drilling fluids are cost effective and environmentally friendly compared to oil-based muds. However, WBMs create wellbore instability problems in water-sensitive and highly reactive shale formations. Due to absorption of water by clay minerals in shale, the shale swells; this drastically changes the stress regime and the mechanical strength of shale formation decreases. This may result in a collapse of the wellbore during the drilling process. On the contrary, OBMs have exceptional shale inhibition characteristics, better lubricity and high temperature stability, preserves the integrity of wellbore formations, and are the preferred choice for formations containing water-sensitive shales.

Various components are added to OBMs: a) rheology modifiers, in order to impart viscosity and filtration properties; b) weighting agents, such as soluble salts or insoluble inorganic minerals used to increase the fluid density, for example calcium carbonate, siderite, hematite, barite, and the like; c) emulsion stabilizing agents; d) additives useful to impart desirable properties, such as fluid loss reducers, wetting agents, dispersants, lubricants, and the like.

In particular, invert emulsions require the addition of one or more emulsion stabilizing agents, also referred to as emulsifiers, which prevent the droplets coalescence, phase separations and the reduction of their performances.

The emulsifiers that are traditionally used in subterranean treatment fluids have surfactant-character, comprising a hydrophobic portion and a hydrophilic portion.

Examples of these emulsifiers are (poly)amides that are obtained from the condensation of fatty acids/carboxylic acids with (poly)amines, which show remarkable emulsifying and dispersing properties and are useful in various applications where invert emulsions are formed.

The preferred polyamides are made from the condensation reaction between fatty acids and polyamines. The fatty acids and polyamines are reacted in such proportions as to create a "partial amide" (aminoamide) intermediate product and the remaining amine sites of this intermediate are further reacted with an acid anhydride or polycarboxylic acid to produce a carboxylic acid-terminated polyamide.

WO 89/11516 relates to an oil-based well-working fluid comprising: a) an emulsifier comprising the reaction product of i) one or two moles of an amido-amine or a hydroxyalkyl amide with ii) one to five moles of a dicarboxylic acid or an acid anhydride; b) a hydrocarbon drilling oil; and c) a sodium, calcium or magnesium brine.

U.S. Pat. No. 4,501,672 discloses fluid loss reducing additives for oil-based working fluids, which is obtained by reacting 1 mole of dialkylene triamine with 2 moles of fatty acid. The aminoamide so obtained is then reacted with maleic anhydride (Example 1).

US 2003/162668 describes a method and a product which provides emulsion stability and filtration control to invert emulsion drilling fluids. The product comprises a blend of a carboxylic acid terminated polyamide and a mixture produced by the Diels-Alder reaction of dienophiles.

US 2011/0306523 relates to emulsifiers for oil-based drilling fluids based on the polyamides derived from fatty acids/carboxylic acids and optionally alkoxylated polyamines.

US 2014/121135 discloses an invert emulsion comprising an aqueous fluid, an oleaginous fluid and an emulsifier composition, wherein the emulsifier composition comprises: from 25 to 100 wt % of an emulsifier, which can comprise a carboxylic acid-terminated polyamide. This may be a product of a condensation reaction between a fatty acid, a polyamine and an acid anhydride or a polycarboxylic acid.

Unfortunately, these polyamides interact with shales increasing their hydrophobicity and their compatibility with the organic solvent. Actually, the polyamides increase the swelling and dispersion capacity of the shales in organic solvents. Consequently, the same disastrous problems found with the WBM in the treatment of subterranean formations containing shales can arise for OBM.

Now, it has surprisingly been found that particular polyamides obtained by reacting $C_6$-$C_{30}$ aliphatic monocarboxylic acids or esters thereof and polyamines, and, subsequently, unsaturated dicarboxylic acids or anhydrides thereof in a specific ratio, when heated at temperature ranging from 130 and 200° C. for a proper lapse of time, markedly increase their average molecular weight and show a surprisingly lower capacity to interact with shales and to increase their hydrophobicity, compared to the same polyamides before heating. This markedly reduces the swelling and dispersion of shales in the fluid and allows enhancing shale wellbore stability during the treatment of subterranean formations.

At the same time, the emulsion stabilizing agents so obtained show good properties as emulsifiers and rheology modifiers, being able to guarantee an optimal rheology profile and an excellent stability of the fluids in the presence of solid components/contaminants, even at the high temperatures, which can be found in the subterranean treatments, for examples in oil-well drilling.

With the expression "cured", we mean that the polyamides are subjected to heating cycles wherein a crosslinking of the various molecules occurs increasing their molecular weight and allowing the development of the surprising and unexpected properties of the emulsion stabilizing agents of the invention.

Unless otherwise specified, the percent weight/volume is expressed in gram/100 ml, equivalent to 3.5 pound/barrel.

In the present disclosure, the saponification number is determined according to the standard method ASTM D 5558-95.

DESCRIPTION OF THE INVENTION

It is therefore an object of the present invention an emulsion stabilizing agent, which is a polyamide which has been prepared by reacting in a first step:
  a) one mole of a polyamine having n amino groups with exchangeable hydrogens, wherein n is an integer ranging from 3 to 5;
  b) from n/2 to n-0.8 moles of a $C_6$-$C_{30}$ saturated or unsaturated aliphatic monocarboxylic acid or an ester thereof or mixtures thereof;
  to obtain an aminoamide characterized by a saponification number below 30 mg$_{KOH}$/g; and, subsequently, in a second step, reacting the aminoamide with:
  c) from 0.4 to 1.1 moles of a $C_4$-$C_6$ unsaturated dicarboxylic acid or with the corresponding anhydride for each mole of remaining amino groups bearing exchangeable hydrogens;
  with the proviso that during or after the second step the reaction mass is heated (cured) at temperature ranging from 130 to 200° C. until at least 30 by weight (wt %) of the emulsion stabilizing agent has a molecular weight higher than 1700 Da, as determined by organic gel permeation chromatography (GPC) calibrated with polyethylene glycol standards.

It is another object of the invention a method of treating a subterranean formation that comprises the steps of:
  i. providing a water-in-oil subterranean treatment fluid containing an oil phase, an aqueous phase and from 0.3 to 5.0 g/100 ml of said emulsion stabilizing agent and
  ii. introducing this fluid into the subterranean formation at a pressure to treat the formation;
  wherein said emulsifier does not increase the swelling and dispersion of shales in the fluid.

Further, according to the invention, there is provided a water-in-oil subterranean treatment fluid comprising: an oil phase, an aqueous phase and from 0.3 to 5.0 g/100 ml of said emulsion stabilizing agent.

BRIEF DESCRIPTION OF THE DRAWINGS

FIG. 1. $^1$H-NMR of the emulsion stabilizing agent of comparative Example 1.

FIG. 2. $^1$H-NMR of the emulsion stabilizing agent of Example 2.

FIG. 3. $^1$H-NMR of the emulsion stabilizing agent of Example 4.

DETAILED DESCRIPTION OF THE INVENTION

With the term "polyamide", we mean the product obtained by the above detailed process, i.e. by preparing in a first step an aminoamide by reaction of one mole of a polyamine having n primary or secondary amino groups, wherein n is an integer ranging from 3 to 5, with from n/2 to n-0.8 moles of a saturated or unsaturated $C_6$-$C_{30}$ aliphatic monocarboxylic acid; and, in a second step, reacting the remaining primary or secondary amino groups with from 0.4 to 1.1 moles of a unsaturated $C_4$-$C_6$ dicarboxylic acid or the corresponding anhydride for each remaining primary or secondary amino groups.

During or after the second step the reaction mass is heated at temperature ranging from 130 to 200° C. until at least 30 by weight (wt %) of the resulting emulsion stabilizing agent has a molecular weight higher than 1700 Da, as determined by organic gel permeation chromatography calibrated with polyethylene glycol standards.

The aminoamide, which is obtained in the first step of the process for the preparation of the polyamides, may actually be a mixture of aminoamides.

Preferably, the aminoamide of the invention is obtained by condensing one mole of polyamine with from n/2 to n-1.0 moles of a $C_6$-$C_{30}$ saturated or unsaturated aliphatic monocarboxylic acid or an ester thereof or mixtures thereof.

In a preferred embodiment of the invention, the polyamine has n primary or secondary amino groups, wherein n is 3 or 4. More preferably n is 3. Suitable polyamines that may be used for the preparation of the polyamides of the invention include, for example, polyalkylene polyamines.

The polyalkylene polyamines that advantageously may be employed as a starting material include compounds having the formula I:

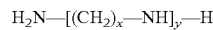

$$H_2N-[(CH_2)_x-NH]_y-H \qquad \qquad I$$

where x is an integer ranging from 2 to 6 and y is an integer ranging from 2 to 4.

Examples of suitable polyamines of formula I are diethylene triamine, triethylene tetramine, tetraethylene pentamine, dipropylene triamine, tripropylene tetramine, dihexamethylene triamine and the like.

Preferably, the polyamine has formula I in which x is 2 and y is 2 or 3 and is therefore diethylene triamine or triethylene tetramine. More preferably, in formula I x is 2 and y is 2, i.e. the polyamine is diethylene triamine.

In a preferred embodiment of the invention the polyamine is reacted with a $C_6$-$C_{30}$ saturated or unsaturated aliphatic monocarboxylic acid or a mixture of $C_6$-$C_{30}$ saturated or unsaturated aliphatic monocarboxylic acids.

Examples of $C_6$-$C_{30}$ unsaturated aliphatic monocarboxylic acids suitable for the present invention include both monounsaturated and polyunsaturated aliphatic carboxylic acids with from 6 to 30 carbon atoms. Examples of these acids are palmitoleic acid, oleic acid, linoleic acid, linolenic acid, arachidonic acid, and the like.

Examples of $C_6$-$C_{30}$ saturated aliphatic monocarboxylic acids include decanoic acid, lauric acid, myristic acid, palmitic acid, stearic acid, behenic acid, and the like.

In a preferred embodiment, the $C_6$-$C_{30}$ monocarboxylic acid is a $C_{10}$-$C_{24}$ saturated or unsaturated aliphatic monocarboxylic acid.

In another preferred embodiment, the $C_6$-$C_{30}$ monocarboxylic acid is a mixture of $C_{10}$-$C_{24}$ saturated and unsaturated aliphatic monocarboxylic acids.

In a more preferred embodiment of the invention, the $C_6$-$C_{30}$ monocarboxylic acid is a mixture of $C_{10}$-$C_{24}$ saturated and unsaturated aliphatic monocarboxylic acids comprising at least 40% by weight, preferably at least 60% by weight, of unsaturated aliphatic monocarboxylic acids.

Mixtures of monocarboxylic acid derived from natural oils, such as coconut oil, mustard seed oil, palm oil, palm olefin, soybean oil, rapeseed oil, canola oil, tall oil, sunflower oil, and mixtures thereof, are particularly preferred.

Mixtures of monocarboxylic acids obtained as a by-product in the process of the biodiesel production are also suitable sources of $C_6$-$C_{30}$ saturated and unsaturated aliphatic monocarboxylic acids.

Recycled waste cooking oils and fats are other useful sources of saturated or unsaturated aliphatic monocarboxilic acids. Waste cooking oils and fats are used cooking oil and fats, collected by the urban waste system and delivered to authorized regeneration plants. Waste cooking oils and fats are generally composed by mono-, di- and triglycerides, glycerol, free fatty acids, some water, and degradation products, such as polymerization products. The main steps in the waste oil recycling process usually includes washing the waste oils with water and/or filtering them, removing waxes, polar compounds and separating metal traces and other impurities.

By-products of edible oil and fat refining, such as acid oils, hydrolized acid oils or fatty acid distillates, are further sources of $C_6$-$C_{30}$ saturated or unsaturated aliphatic mono-carboxylic acids Preferably, the monocarboxylic acid source is selected from tall oil, rapeseed oil, soybean oil, by-products of the process of the biodiesel production, recycled waste cooking oils and fats, by-products of edible oil and fat refining and mixtures thereof.

Tall oil is particularly preferred as the $C_6$-$C_{30}$ saturated and unsaturated aliphatic monocarboxylic acids source for use in the process for making the polyamides of the present invention.

In another preferred embodiment of the invention, the aminoamide of the invention is obtained by reacting one mole of the polyamine having n amino groups with exchangeable hydrogens and an appropriate amount of an ester of $C_6$-$C_{30}$ saturated or unsaturated aliphatic monocarboxylic acids or a mixture thereof.

Examples of suitable esters are methyl esters; mono-, di- and tri-glycerides; natural oils or fats; recycled waste cooking oils or fats, by-products of edible oil and fat refining; and mixtures of these esters.

In a more preferred embodiment, the ester is chosen among natural oils and fats; recycled waste cooking oils and fats; by-products of edible oil and fat refining; and mixtures thereof. Suitable natural oils are those mentioned above, e.g. coconut oil, rapeseed oil, mustard seed oil, palm oil, palm olefin, soybean oil, canola oil, sunflower oil, and mixture thereof. Soybean oil and rapeseed oil are the preferred natural oils for the realization of the present embodiment.

In the most preferred embodiment, the polyamine having n amino groups with exchangeable hydrogens is directly reacted with an appropriate amount of recycled waste cooking oils and fats or by-products of edible oil and fat refining or mixtures thereof. Examples of suitable by-products are acid oils, which are products obtained during the deacidification of oils and fats of vegetable or animal origin by means of alkali. Main components of acids oils are fatty acids and mono-, di- and tri-glycerides.

Alternatively, the aminoamide of the invention can be prepared using mixtures of esters of $C_6$-$C_{30}$ saturated or unsaturated aliphatic monocarboxylic acids and $C_6$-$C_{30}$ saturated or unsaturated aliphatic monocarboxylic acids.

In another more preferred embodiment, the aminoamide of the invention is obtained by reacting the polyamine having n amino groups with exchangeable hydrogens with an appropriate amount a mixture of $C_6$-$C_{30}$ saturated or unsaturated aliphatic monocarboxylic acids and an ester chosen among natural oils and fats, recycled waste cooking oils and fats and by-products of edible oil and fat refining.

The preparation of the aminoamide may be carried out according to methods well known to those skilled in the art. For example, by heating the polyamine and the monocarboxylic acid or the corresponding ester, such as a natural oil, up to 250° C., preferably from 140 to 180° C., either or not, in a suitable hydrocarbon solvent such as toluene or xylene and removing the formed water by azeotropic distillation. A catalyst such as p-toluenesulphonic acid, zinc acetate, zirconium naphthenate or tetrabutyl titanate, can be also present. The end-point of the reaction is considered to be reached when the saponification number of the aminoamide, determined by ASTM standard method D5558-95 respectively, is below 30 $mg_{KOH}/g$, preferably below 25 $mg_{KOH}/g$, more preferably below 15 $mg_{KOH}/g$.

Generally, in the first step one mole of polyamine is preferably reacted with from n-1.5 to n-1 moles of $C_{10}$-$C_{24}$ saturated or unsaturated aliphatic monocarboxylic acid or ester thereof or mixtures thereof.

When the polyamine used is diethylene triamine, one mole of diethylene triamine is reacted with from 1.5 to 2.0 moles of said $C_{10}$-$C_{24}$ aliphatic monocarboxylic acid or ester thereof or mixtures thereof.

In the second step, the aminoamide is reacted with from 0.4 to 1.1 moles of a $C_4$-$C_6$ unsaturated di-carboxylic acid or with the corresponding anhydride for each mole of remaining amino groups bearing exchangeable hydrogens.

The number of remaining amino groups bearing exchangeable hydrogens is calculated from the difference between the number amino groups with exchangeable hydrogens n and moles of a $C_6$-$C_{30}$ saturated or unsaturated aliphatic monocarboxylic acid or an ester thereof used in the first step.

Preferably, the aminoamide is reacted with from 0.4 to 1.0 moles, more preferably with from 0.5 to 1.0 moles, of $C_4$-$C_6$ unsaturated dicarboxylic acid or with the corresponding anhydride for each mole of remaining amino group with exchangeable hydrogens.

Examples of suitable unsaturated $C_4$-$C_6$ di-carboxylic acids include maleic acid, fumaric acid, citraconic acid, ethyl-maleic acid, mesaconic acid, itaconic acid and mixtures thereof.

Preferably, the $C_4$-$C_6$ unsaturated dicarboxylic acid c) is a $C_4$ unsaturated dicarboxylic acid. Dicarboxylic acids or anhydride which are particularly suitable for the realization of the present invention are maleic acid, fumaric acid and maleic anhydride, and mixtures thereof. Maleic acid and, in particular, maleic anhydride are the most preferred di-carboxylic acid/anhydride.

Most preferably, the polyamide, useful for the preparation of the emulsion stabilizing agent of the invention, is obtained by reacting:
a) one mole of diethylene triamine;
b) from 1.5 to 2 moles of a mixture of saturated or unsaturated $C_{10}$-$C_{24}$ aliphatic monocarboxylic acids or esters thereof or a mixture of both;
and, subsequently, reacting the aminoamide with:
c) from 0.4 to 1.0 moles of maleic anhydride for each mole of remaining amino groups bearing exchangeable hydrogens.

In one embodiment of the invention, the aminoamide containing amino groups with exchangeable hydrogens and the unsaturated $C_4$-$C_6$ di-carboxylic acid or the corresponding anhydride are reacted at temperature ranging from 130 to 200° C., while the formed water is distilled off, and until the polyamide reaches the above indicated molecular weight. In this case, the so obtained polyamide does not require a further step of heating.

In another embodiment of the invention, the aminoamide containing amino groups with exchangeable hydrogens and an anhydride of the unsaturated dicarboxylic acid described above are condensed at a temperature ranging from about 75 to about 120° C., preferably about 85 to about 110° C. This process at low temperature requires a subsequent step of heating at temperature ranging from 130 to 200° C.

Preferably, the heating step is performed at a temperature ranging from 140 to 190° C., more preferably from 150 to 185° C., for a time sufficient to reach the desired molecular weight. The heating time can range from 30 min to 60 hours, depending on the heating temperature. The higher the temperature, the shorter the required heating time.

Most preferably, the heating step is performed at a temperature from 150 to 185° C. for 2-10 hours.

The heating causes an increment of the average molecular weight of the polyamide and at least 30 wt % of the emulsion stabilizing agent of the invention has a molecular weight higher than 1700 Da as determined by organic gel permeation chromatography (GPC).

In a preferred embodiment of the invention, at least 40 wt % of the emulsion stabilizing agent has a molecular weight higher than 1700 Da.

In the most preferred embodiment of the invention, at least 50 wt % of the emulsion stabilizing agent has a molecular weight higher than 1700 Da.

Usually, at most 85 wt % of the emulsion stabilizing agent has a molecular weight higher than 1700 Da.

Preferably, at most 75 wt % of the emulsion stabilizing agent has a molecular weight higher than 1700 Da The above described emulsion stabilizing agents imparts a high stability to water-in-oil subterranean treatment fluids.

The water-in-oil subterranean treatment fluid of the present invention comprises an oil phase, an aqueous phase (a water-based fluid that is at least partially immiscible with the oil phase), and from 0.3 to 5.0 g/100 ml, preferably from 0.8 to 4.0 g/100 ml, of an emulsion stabilizing agent according to the invention.

According to an advantageous embodiment of the present invention, the water-in-oil fluids do not comprise any additional emulsifier, except the emulsion stabilizing agent of the present invention.

The concentration of the oil phase in the water-in-oil fluid should be sufficient so to form an invert emulsion and may be less than about 90 percent in volume of the invert emulsion (vol. %).

Usually, the amount of oil phase is from about 20 to about 85 vol. %,

In a preferred embodiment, the oil phase is from about 50 to about 85 vol. % based on the total volume of fluid the invert emulsion.

In another embodiment, invert high internal phase ratio emulsions, i.e. systems possessing a larger volume of internal aqueous phase (>50% in volume), are preferred because of the significant reduction of the oil phase, with its associated costs and possible environmental concerns for possible contaminations and waste disposal.

The oil phase used in the invert emulsions of the present invention may comprise any oil-based fluid suitable for use in emulsions.

The oil phase may derive from a natural or synthetic source. Examples of suitable oil phases include, without limitation, diesel oils, paraffin oils, mineral oils, low toxicity mineral oils, olefins, esters, amides, amines, synthetic oils such as polyolefins, ethers, acetals, dialkylcarbonates, and combinations thereof.

The preferred oil phases are paraffin oils, low toxicity mineral oils, diesel oils, mineral oils, polyolefins, olefins and mixtures thereof.

Factors determining which oil phase will be used in a particular application, include but are not limited to, its cost and performance characteristics, environmental compatibility, toxicological profile and availability.

The invert emulsions of the present invention also comprise an aqueous phase that is at least partially immiscible in the oil phase.

Suitable examples of aqueous phase include fresh water, sea water, salt water, brines (e.g. saturated salt waters), glycerin, glycols, polyglycol amines, polyols and derivatives thereof, that are partially immiscible in the oleaginous fluid, and combinations thereof.

Suitable brines may include heavy brines.

Heavy brines, for the purposes of this application, include brines with various salts at variable concentrations, that may be used to weight up a fluid; generally, the use of weighting agents is required to provide the desired density of the fluid.

Brines generally comprise water soluble salts.

Suitable water-soluble salts are sodium chloride, calcium chloride, calcium bromide, zinc bromide, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and mixtures thereof.

The aqueous phase is chosen taking into account several factors including cost, environmental profile, density, availability, and which oil phase has been chosen. Another factor that may be considered is the application of the subterranean treatment fluid.

For example, if the application needs an emulsion with a heavy weight, a zinc bromide brine may be chosen.

Examples of weighting agents include metal powders, metal oxides or metal salts such as: barite, hematite, ilmenite, hausmannite, magnetite, celesite, siderite, iron oxide, manganese tetroxide, zircon, titania, barium titanate, calcium carbonate, strontium carbonate, alpha alumina and sand.

The subterranean treatment fluids of the invention may further comprise conventional additives including wetting agents, fluid loss agents, thickeners, dispersants, lubricants, anti-oxidants, scale inhibitors, pH modifiers, and the like.

The water-in-oil subterranean treatment fluids of the invention may be suitable for use in a variety of subterranean applications wherein water-in-oil emulsions are used; these applications include drilling, completion, stimulation operations (such as fracturing), work-over, cementing, maintenance and reactivation.

To better illustrate the invention, the following examples are reported to show the effect of the addition of different polyamides and of prior art in exemplary water-in-oil drilling fluids.

EXAMPLES

Characterization Methods

The saponification number was determined following the ASTM standard method ASTM-D5558-95.

Organic gel permeation chromatography (GPC) was used to determine the molecular weight of the emulsion stabilizing agents.

The determinations were performed using a HPLC equipped with a refractive index detector and tetrahydrofurane (THF) as the mobile phase.

The $^1$H-NMR spectra were obtained on a $CDCl_3$ solution with a Jeol ECZ 400S NMR.

The following Phenomenex columns were used at a temperature of 40° C.: Phenogel 5μ 10E3A (300×4.6 mm), Phenogel 5μ 500A (300×4.6 mm), Phenogel 5μ 100A (300× 4.6 mm), Phenogel 5μ 50A (300×4.6 mm) and Phenogel 5μ (30×4.6 mm) guard column.

The HPLC was set at a flow rate of 0.6 ml/min for a total run time of 35 minutes.

Polyethylene glycols with molecular weights ranging from 440 to 21,300 Da were used as molecular weight standards for the calibration of the chromatography system.

Emulsion stabilizing agent solutions were prepared by dissolving 50 mg of sample in 10 ml of THF.

50 microliters of each solution (samples and standards), filtered on a 0.45 micron membrane filter, were injected into the HPLC.

The chromatographic software Turbo SEC 6.2.1.0.104: 0104 (Perkin Elmer) was used for the molecular weight evaluation.

Emulsion Stabilizing Agent Preparation

Example 1 (Comparative)

578 g (2.0 moles) of tall oil fatty acids (TOFA) were loaded in a 2000 ml glass reactor equipped with a Dean-Stark apparatus and a mechanical blade stirrer and heated to about 50° C. Then 103 g (1.0 mole) of diethylene triamine (DETA) were added. The reaction mixture was further heated to 160° C. and was maintained at this temperature for 6 hours. At the end of the reaction, the aminoamide had a saponification number lower than 20 mg$_{KOH}$/g. Subsequently, the mass was cooled to about 80° C. and 98.0 g (1 mole) of maleic anhydride (MA) were slowly added. The reaction temperature was increased to 90° C. After 120 minutes, the reaction mass was diluted 1:1 wt with Amodrill 1000 (Ineos Oligomers). This procedure allows to obtain an emulsion stabilizing agent having a molar ratio of fatty acids (FA)/DETA/MA of 2/1/1.

Example 2

An aliquot of the undiluted emulsion stabilizing agent of Example 1 was further heated at temperature of 165° C. until more than 50% by weight (wt %) of the emulsion stabilizing agent has a molecular weight higher than 1700 Da.

The final product was diluted 1:1 wt with Amodrill 1000.

Examples 3 (Comparative) and 4

The emulsion stabilizing agents of Examples 3-4 were prepared following the same procedure of Examples 1 and 2, respectively. A recycled waste cooking oil (Olio Vegetable Rigenerato per Uso Ind., from Meani s.r.l.) (RVO) was used as a source of fatty acids.

Example 5 (Comparative)

636 g (2.2 moles) of tall oil fatty acids (TOFA) were loaded in a 2000 ml glass reactor equipped with a Dean-Stark apparatus and a mechanical blade stirrer and heated to about 50° C. Then 103 g (1.0 mole) of diethylene triamine (DETA) were added. The reaction mixture was further heated to 160° C. and was maintained at this temperature for 6 hours. At the end of the reaction, the aminoamide had a saponification number lower than 20 mg$_{KOH}$/g. Subsequently, the mass was cooled to about 80° C. and 59.0 g (0.6 mole) of maleic anhydride (MA) were slowly added. The reaction temperature was increased to 150° C. After 90 minutes, the reaction mass was diluted 1:1 wt with Amodrill 1000.

Table 1 reports the % weight fraction of the emulsion stabilizing agents having a molecular weight higher than 1700, together with the molar ratio of the ingredients, the heating temperature and heating time.

TABLE 1

| | Fatty Acids Source | FA/DETA/AM Molar Ratio | T ° C. | t min | MW > 1700 Da % wt |
|---|---|---|---|---|---|
| Example 1* | TOFA | 2/1/1 | — | — | 5 |
| Example 2 | TOFA | 2/1/1 | 165 | 360 | 63 |
| Example 3* | RVO | 2/1/1 | — | — | 6 |
| Example 4 | RVO | 2/1/1 | 165 | 360 | 53 |
| Example 5* | TOFA | 2.2/1.0/0.6 | 150 | 90 | 9 |

*Comparative $^1$H-NMR Spectra

FIG. 1-3 show the $^1$H-NMR spectra of Example 1-3, respectively. In these spectra the signals of the main ingredients of the emulsion stabilizing agents, e.g. the CH$_3$— and —CH$_2$— groups of the alkyl chains of the fatty acid, the —CH$_2$— groups bound to the nitrogen can be identified. In particular, in the spectrum of FIG. 1, there are weak signals between 6.0 and 7.0 ppm which can be attributed to bound maleic anhydride (doublet of doublets), and to free maleic anhydride (singlet).

In the spectrum of FIG. 2, these weak signals between 6.0 and 7.0 ppm disappear.

Moreover, the signals between 3 and 4 ppm, which can be assigned to the —CH$_2$— groups close to nitrogen, are much broader and less defined than the signals in the spectrum of FIG. 1. The same can be said for the signals between 2.1 and 2.5 ppm, which can be assigned to the —CH$_2$— groups bound to the carboxylic groups of the amide.

These evidences confirm that, during the heating step, a curing occurs, leading to an increase of the molecular weight of the emulsion stabilizing agents of the invention.

Shale Recovery Test

Dispersive shales with a particle size comprised between 4 mm (5 mesh) and 2 mm (10 mesh) were used in the following test.

The initial moisture content of the shales was determined by weight loss at 105° C.

Simplified oil-based drilling muds were prepared by means of a Hamilton Beach Mixer according to the formulations described in Table 2.

TABLE 2

| Ingredient | Amount |
|---|---|
| Mineral Oil | 220 g |
| Brine CaCl$_2$ 30% w/w | 102 g |
| Example | 10 g |

30.00 g of shales were added to each mud in a stainless steel ageing cell. The ageing cells were sealed and carefully shacked to disperse the shale particles. The cells were then placed in a pre-heated oven and were hot rolled at 65° C. for 16 hours. At the end of the hot rolling, the cells were cooled to room temperature and their content was poured onto two sieves: 10 mesh (2 mm) and 35 mesh (0.5 mm).

The recovered shales were dried in oven at 105° C. to constant weight (usually for 16 h). After drying, the shales were cooled in a desiccator and weighed. The percent recovery of the shales was calculated using the following formula:

% recovery=(weight in grams of the recovered shales)/((30−($w_h$/30×100))×100 where $w_h$ is the initial moisture content in % by weight of the shales.

The results are reported in Table 3. High-percent recoveries are indicative of shale-inhibitive fluids.

TABLE 3

|  | Example 1* | Example 2 | Example 3* | Example 4 | Example 5* |
| --- | --- | --- | --- | --- | --- |
| Recovery 10 mesh (%) | 1.4 | 62.3 | 4.3 | 38.0 | 13 |
| Recovery 35 mesh (%) | 0.7 | 1.4 | 1.7 | 3.6 | 1.5 |
| Total Recovery (%) | 2.1 | 63.7 | 6.0 | 41.1 | 14.5 |

*Comparative

The data of Table 3 demonstrate that the emulsion stabilizing agents of the invention have a much lower capacity of interaction with shales than the emulsion stabilizing agent of the prior art.

The recoveries of the shale after hot-rolling at 120° C. were also determined. The results are reported in Table 4.

TABLE 4

|  | Example 2 | Example 4 |
| --- | --- | --- |
| Recovery 10 mesh (%) | 46.3 | 24.2 |
| Recovery 35 mesh (%) | 5.5 | 4.8 |
| Total Recovery (%) | 51.8 | 29.0 |

The emulsion stabilizing agents of the invention show good recoveries also in a more demanding test.

The invention claimed is:

1. A water-in-oil subterranean treatment fluid, comprising an aqueous phase, an oil phase and from 0.3 to 5.0 g/100 ml of an emulsion stabilizing agent, which is a polyamide obtained by reacting in a first step:
   a) one mole of a polyamine having n amino groups with exchangeable hydrogens, wherein n is an integer ranging from 3 to 5; and
   b) from n/2 to n-0.8 moles of a $C_6$-$C_{30}$ saturated or unsaturated aliphatic monocarboxylic acid or an ester thereof or mixtures thereof;
   to obtain an aminoamide characterized by a saponification number below 30 $mg_{KOH}$/g; and, subsequently, in a second step, reacting the aminoamide with:
   c) from 0.4 to 1.1 moles of a $C_4$-$C_6$ unsaturated dicarboxylic acid or with the corresponding anhydride for each mole of remaining amino groups bearing exchangeable hydrogens;
   to obtain the polyamide; with the proviso that during or after the second step the reaction mass is heated at temperature ranging from 130 to 200° C. until at least 30 by weight (wt %) of the emulsion stabilizing agent has a molecular weight higher than 1700 Da, as determined by organic gel permeation chromatography calibrated with polyethylene glycol standards;
   wherein said emulsion stabilizing agent of which at least 30 wt % has a molecular weight higher than 1700 Da has a total recovery in a shale recovery test higher than a polyamide prepared identically except for not being heated to the temperature ranging from 130 to 200° C.

2. The water-in-oil subterranean treatment fluid of claim 1, wherein at least 40 wt % of the emulsion stabilizing agent has a molecular weight higher than 1700 Da.

3. The water-in-oil subterranean treatment fluid of claim 1, wherein the polyamine is a polyalkylene polyamine having formula I:

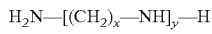

where x is an integer ranging from 1 to 6 and y is an integer ranging from 2 to 4.

4. The water-in-oil subterranean treatment fluid of claim 3, wherein in formula I x is 2 and y is 2 and the polyamine is diethylene triamine.

5. The water-in-oil subterranean treatment fluid of claim 1, wherein the saturated or unsaturated $C_6$-$C_{30}$ aliphatic monocarboxylic acid is a mixture of $C_6$-$C_{30}$ saturated or unsaturated aliphatic monocarboxylic acids derived from a natural oil.

6. The water-in-oil subterranean treatment fluid of claim 1, wherein the ester of saturated or unsaturated $C_6$-$C_{30}$ aliphatic monocarboxylic acid is chosen among methyl esters; mono-, di- and tri-glycerides; natural oils or fats; recycled waste cooking oils or fats, by-products of edible oil and fat refining; and mixtures of these esters.

7. The water-in-oil subterranean treatment fluid of claim 6, wherein the ester of saturated or unsaturated $C_6$-$C_{30}$ aliphatic monocarboxylic acid is chosen among natural oils or fats; recycled waste cooking oils or fats, by-products of edible oil and fat refining; and mixtures thereof.

8. The water-in-oil subterranean treatment fluid of claim 1, wherein the $C_4$-$C_6$ unsaturated di-carboxylic acid or the corresponding anhydride are maleic acid or maleic anhydride.

9. A method of treating a subterranean formation that comprises the steps of:
   i. providing a water-in-oil subterranean treatment fluid containing an oil phase, an aqueous phase and from 0.3 to 5.0 g/100 ml of an emulsion stabilizing agent, which is a polyamide obtained by reacting in a first step:
      a) one mole of a polyamine having n amino groups with exchangeable hydrogens, wherein n is an integer ranging from 3 to 5; and
      b) from n/2 to n-0.8 moles of a $C_6$-$C_{30}$ saturated or unsaturated aliphatic monocarboxylic acid or an ester thereof or mixtures thereof;
      to obtain an aminoamide characterized by a saponification number below 30 $mg_{KOH}$/g; and, subsequently, in a second step, reacting the aminoamide with:
      c) from 0.4 to 1.1 moles of a $C_4$-$C_6$ unsaturated dicarboxylic acid or with the corresponding anhydride for each mole of remaining amino groups bearing exchangeable hydrogens;
   to obtain the polyamide; with the proviso that during or after the second step the reaction mass is heated at temperature ranging from 130 to 200° C. until at least 30 by weight (wt %) of the emulsion stabilizing agent has a molecular weight higher than 1700 Da, as determined by organic gel permeation chromatography calibrated with polyethylene glycol standards;
   wherein said emulsion stabilizing agent of which at least 30 wt % has a molecular weight higher than 1700 Da has a total recovery in a shale recovery test higher than an emulsion stabilizing agent prepared identically except for not being heated to the temperature ranging from 130 to 200° C.; and ii. introducing this fluid into the subterranean formation at a pressure to treat the formation.

10. The method of claim 9, wherein at least 40 wt % of the emulsion stabilizing agent has a molecular weight higher than 1700 Da.

11. The method of claim 9, wherein said polyamine is a polyalkylene polyamine having formula I:

$$H_2N-[(CH_2)_x-NH]_y-H \qquad I$$

where x is an integer ranging from 1 to 6 and y is an integer ranging from 2 to 4.

12. The method of claim 11, wherein in formula I x is 2 and y is 2 and the polyamine is diethylene triamine.

13. The method of claim 9, wherein the saturated or unsaturated $C_6$-$C_{30}$ aliphatic monocarboxylic acid is a mixture of $C_6$-$C_{30}$ saturated or unsaturated aliphatic monocarboxylic acids derived from a natural oil.

14. The method of claim 9, wherein the ester of saturated or unsaturated $C_6$-$C_{30}$ aliphatic monocarboxylic acid is chosen among methyl esters; mono-, di- and tri-glycerides; natural oils or fats; recycled waste cooking oils or fats, by-products of edible oil and fat refining; and mixtures of these esters.

15. The method of claim 14, wherein the ester of saturated or unsaturated $C_6$-$C_{30}$ aliphatic monocarboxylic acid is chosen among natural oils or fats; recycled waste cooking oils or fats, by-products of edible oil and fat refining; and mixtures thereof.

16. The method of claim 9, wherein the $C_4$-$C_6$ unsaturated di-carboxylic acid or the corresponding anhydride are maleic acid or maleic anhydride.

* * * * *